_United States Patent_ [19]

McClure

[15] 3,698,520
[45] Oct. 17, 1972

[54] TREAD BRAKE APPARATUS
[72] Inventor: Glenn T. McClure, McKeesport, Pa.
[73] Assignee: Westinghouse Air Brake Company, Wilmerding, Pa.
[22] Filed: June 24, 1971
[21] Appl. No.: 156,394

[52] U.S. Cl. ..................................................188/171
[51] Int. Cl. ..............................................B60t 13/04
[58] Field of Search.........................188/171, 170, 52

[56] References Cited

UNITED STATES PATENTS

3,280,944   10/1966   Kyllonen ....................188/171

Primary Examiner—Richard E. Aegerter
Assistant Examiner—H. S. Lane
Attorney—Ralph W. McIntire, Jr.

[57] ABSTRACT

This invention relates to a spring-applied power-released brake assembly for each individual wheel of a railway car truck, wherein the brake assembly comprises an electrical torque motor that is effective when fully energized to cause a brake release by moving the fulcrum for a proportioning or variable ratio lever relative to this lever against the yielding resistance of a comparatively light control spring to a position in which a comparatively heavy brake-applying spring becomes effective to bias this lever in the brake-release direction. As the current supplied to the torque motor is reduced, the control spring is rendered effective to shift the fulcrum relative to the lever to a position in which the brake-applying spring is effective via one arm of the variable ratio lever to bias this lever in a brake-applying direction and thereafter, in response to a further reduction of current, to increase the length of this one arm to thereby render the brake-applying spring effective via this lever to correspondingly increase the braking force on the wheel.

11 Claims, 4 Drawing Figures

Fig.1

INVENTOR.
GLENN T. McCLURE
BY Ralph W. McIntire, jr.
ATTORNEY

INVENTOR.
GLENN T. McCLURE
BY Ralph W. McIntire, Jr.
ATTORNEY 3,698,520

TREAD BRAKE APPARATUS

BACKGROUND OF THE INVENTION

In several heretofore used spring-applied power-released brake assemblies an electrical torque motor is operably connected to a spiral or clock type spring for effecting the windup thereof to cause a brake release whereupon a subsequent brake application is effected by the spring to a degree corresponding to the reduction effected in the current supplied to the torque motor. When a small reduction in current to this type of brake assembly is effected to cause a corresponding light brake application, the static friction of the various movable elements of the assembly is often great enough to prevent obtaining a change in the degree of brake application. Furthermore, certain of these heretofore used spring-applied power-released brake assemblies embodied therein a traveling nut mounted on a screw and a yieldable connection or cushioning means interposed between the traveling nut and a brake-applying lever for protecting the nut and screw mechanism against shock when a brake shoe contacts the tread surface of a corresponding wheel of the car truck. This cushioning means together with the traveling nut and screw are expensive items which, therefore, increased the total cost of these brake assemblies.

Accordingly, it is the general purpose of this invention to provide a novel and inexpensive spring-applied power-released brake assembly having a pair of springs of unequal strength, the lighter of which constitutes a control spring that is effective in response to a decrease in the current supplied to a torque motor to change the length of the arms of a variable ratio or proportioning lever through which the heavier spring applies a braking force to the tread surface of a car wheel by changing the position of the fulcrum for this lever to thereby enable the heavier spring to increase or decrease the braking force on the wheel without substantial expansion of this spring thereby eliminating the necessity of the work required to recompress this spring if it were expanded.

SUMMARY OF THE INVENTION

According to the present invention, there is provided for braking each individual wheel of a railway car a novel brake assembly wherein the brakes are normally maintained released by power means in the form of an electrical torque motor operably connected through a reduction gear unit to a shaft upon which is mounted a first bell-crank lever, one arm of which is connected to a movable spring seat for effecting a change in the compression of a light coil type control spring. The other arm of this bell-crank lever is operably connected to a carriage member, upon which is mounted a pair of spaced-apart coaxial rollers that constitute a movable fulcrum for a variable ratio or proportioning lever. This lever at one end is connected via a pivoted link to one end of a rockable brake lever that is connected by a ball-and-socket joint to a brake rod pivotally connected at one end to a brake-shoe-carrying brake head. The other end of this proportioning lever is connected to one arm of a second bell-crank lever that has its other arm operably connected to a movable spring seat of a heavy brake-applying spring that is effective to transmit a braking force to the tread surface of the car wheel that varies in accordance with the position of the movable fulcrum relative to the proportioning lever.

Figure 1:
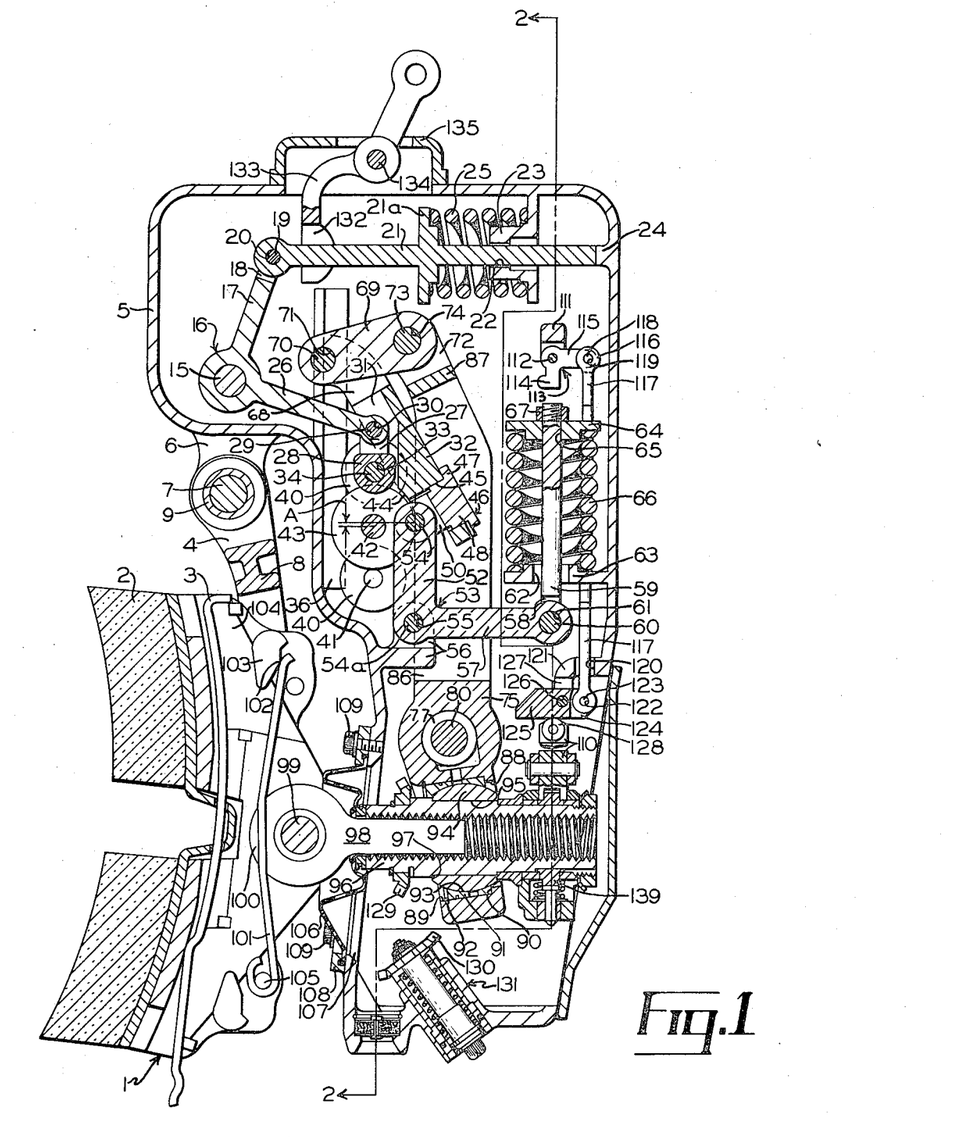
FIG. 1 is a vertical cross-sectional view of a brake assembly showing a spring-applied torque-motor-released brake linkage together with both an automatic and a manual slack adjuster, and part of a manual brake release mechanism for the brake assembly.
Figure 2:
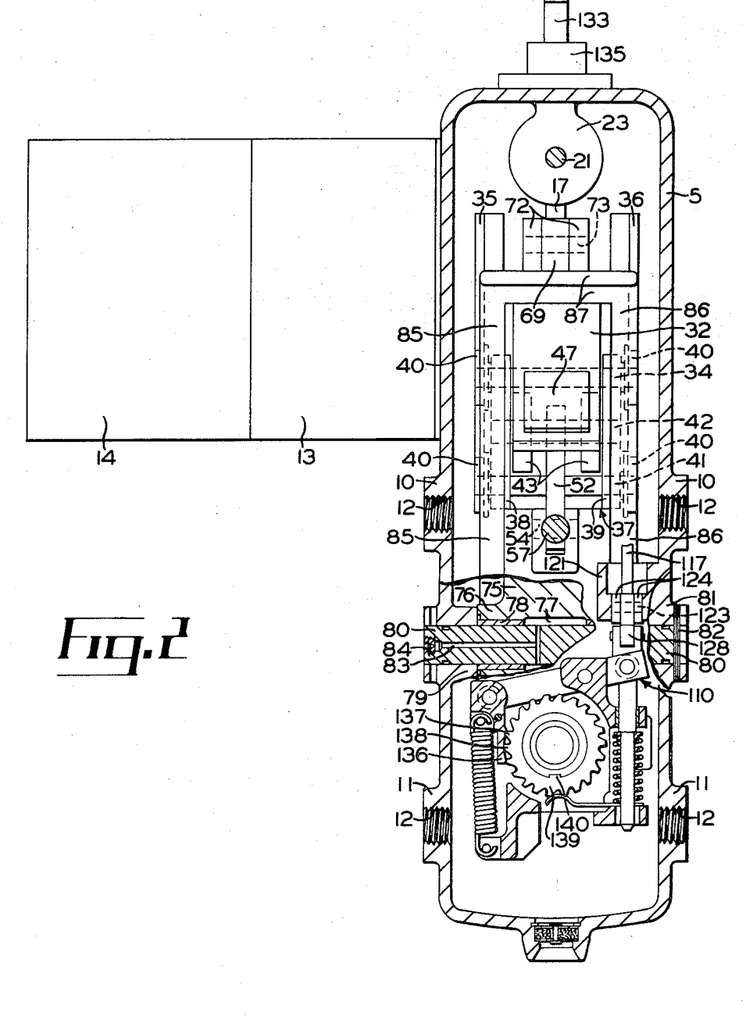
FIG. 2 is a vertical cross-sectional view, taken along the line 2—2 of FIG. 1 and looking in the direction of the arrows.

There is shown in FIGS. 1 and 2 of the drawings one of four brake assemblies associated respectively with the four wheels of one of two car trucks of each railway vehicle. Each brake assembly comprises a brake head 1 (FIG. 1) to which a brake shoe 2, preferably of the composition type as shown, is secured in the usual manner by a key 3, an external brake head hanger 4, and a sectionalized casing or support member comprising a main casing section 5 having formed integral therewith a clevis 6, each of the opposite jaws of which is provided with a bore in which is journaled one end of a pin 7. The brake head hanger 4 comprises two identical parallel links which are integrally connected by a web 8 and suspended from a wear bushing 9 carried by the pin 7 between the jaws of the clevis 6. As shown in FIG. 2, each of two opposite parallel and spaced-apart sides of the casing section 5 is provided with a pair of bosses 10 and 11, through each of which and the wall integral therewith extend two spaced-apart screw-threaded bores 12, only one of which bores appears in FIG. 2, for receiving cap screws (not shown) for securing the casing section 5 to two angle brackets (not shown) which are secured, as for example, by welding, to a truck frame of a railway car truck, it being noted that either pair of the two bosses 10 and 11 may be used accordingly as the brake assembly is mounted on one or the other side of the truck.

As shown in FIG. 2, secured to the left-hand side of the main casing section 5 is a reduction gear unit 13 which may be of any suitable construction. A torque motor 14 is secured to the left-hand end of the reduction gear unit 13 by any suitable means (not shown). The torque motor 14 is provided with an armature shaft (not shown) on the right-hand end of which is mounted for rotation therewith the input gear (not shown) of the gear unit 13.

The output gear of the gear unit 13 is mounted on a shaft 15 (FIG. 1) which extends through a bore (not shown) in the casing section 5 to the interior thereof and has a bell-crank lever 16 rigidly mounted thereon as by means of a press fit.

As shown in FIG. 1, one arm 17 of the bell-crank lever 16 is provided at its upper end with a clevis 18 in the opposite jaws of which are anchored the opposite ends of a pin 19 that extends through a bore 20 provided in a control rod 21 adjacent the left-hand end thereof. This control rod 21 extends through a bore 22 provided in a rod guide bracket 23 that is formed integral with the main casing section 5 and at its right-hand end, while in the position shown in FIG. 1, abuts a stop 24 that also is integral with the casing section 5. The guide bracket 23 constitutes a first spring seat between which and a second spring seat 21a integral with the control rod 21 intermediate the ends thereof is interposed a light control spring 25.

The outer end of the other arm 26 of the bell-crank lever 16 is disposed between the jaws of a clevis 27 formed at the upper end of a short link 28 and operatively connected thereto by a pin 29 that extends through a bore 30 adjacent the outer end of this arm 26 and has its opposite ends anchored in the jaws of this clevis 27.

Figure 3:
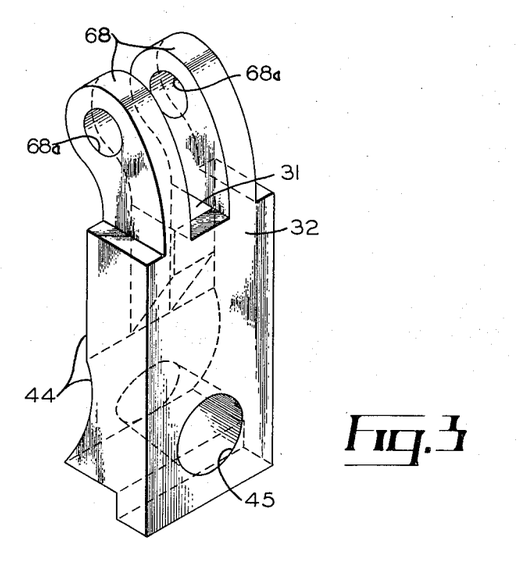
FIG. 3 is a isometric view of the proportioning lever showing further structural details of this lever that are not made apparent in FIGS. 1 and 2.

The upper end of the link 28 is disposed in a recess 31 formed in one side of a proportioning lever 32, best shown in FIG. 3 of the drawings. The lower end of this link 28 is disposed outside of the recess 31 and is provided with a bore 33 (FIG. 1) through which extends a pin 34, the length of which is substantially greater than the width of the lever 32 for a reason hereinafter made apparent.

Formed integral with one side of the main casing section 5 is a track, comprising two spaced-apart rails 35 and 36 (FIG. 2), on which is movably supported a substantially rectangular carriage member 37. Carriage member 37 comprises two parallel spaced-apart bars 38 and 39 (FIG. 2), each being rectangular in cross section and having therein adjacent each of its ends a bore. As shown in FIG. 2, the hereinbefore-mentioned pin 34 extends with a running fit through one of the bores in each of the bars 38 and 39, it being understood that the width of the link 28 is substantially equal to the distance between the bars 38 and 39. Press-fitted onto the opposite ends of the pin 34 and outboard of the bars 38 and 39 is a pair of flanged wheels or rollers 40. These wheels 40 are supported on the rails 35 and 36 and roll therealong when the carriage member 37 is moved in a manner hereinafter described.

The carriage member 37 further comprises a second pin 41 which extends with a running fit through the other bore in each of the bars 38 and 39. This pin 41 has press-fitted onto each of its opposite ends a flanged wheel or roller 40 which is likewise supported on one of the rails 35 or 36.

Midway the ends thereof, each of the bars 38 and 39 is provided with a third bore in which is journaled, with a running fit, one end of a third pin 42, it being understood that the length of this pin is equal to the distance between the two outside parallel sides of the bars 38 and 39.

Press-fitted onto pin 42 in spaced-apart relationship is a pair of wheels or rollers 43, one of which appears in FIG. 1 of the drawings. These wheels 43 constitute a movable fulcrum for the hereinbefore-mentioned proportioning lever 32 and abut a cam surface 44 thereon, these spaced-apart wheels abutting this cam surface on the respective opposite sides of one end of a bore 45 in this lever 32, this bore and cam surface being best shown in FIG. 3 of the drawings.

As best shown in FIG. 3, the upper portion of the cam surface 44 constitutes a straight line and the lower portion is an arc of a circle. As shown in FIG. 1 of the drawings, while the brakes are released, the rollers 43 abut the lower portion of the cam surface 44. Accordingly, when a brake application is effected and the carriage member 37 is moved upward along the rails 35 and 36, the initial movement of the rollers 43 is along a surface that is an arc of a circle, the length of which is such that these rollers 43 reach the end of this arc substantially at the same time as the braking surface of the brake shoe 2 is moved into contact with the tread surface of the car wheel. The lower end of the cam surface 44 being an arc of a circle thus insures fast travel of the brake shoe 2 from its release position, shown in FIG. 1, to its brake-applied position in which the braking surface of this brake shoe is forced against the tread surface of the wheel.

Figure 4:
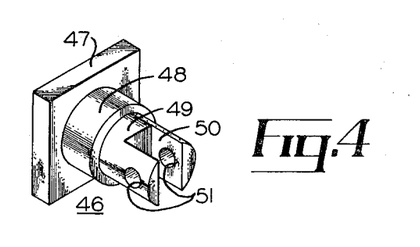
FIG. 4 is an isometric view of a clevis member carried by the proportioning lever shown in FIG. 3.

There is shown in FIG. 4 of the drawings an isometric view of a link 46 that has a square head 47 and two cylindrical portions 48 and 49 of unequal diameter, the diameter of the larger portion 48 being only sufficiently in excess of the diameter of the bore 45 in the proportioning lever 32 to provide for a press fit when this link 46 is assembled to this lever 32.

The cylindrical portion 49 of the smaller diameter is provided with a slot 50, thereby forming a clevis, each jaw of which is provided with a bore 51.

As shown in FIG. 1, the upper end of one arm 52 of a bell-crank lever 53 is disposed in the slot 50 and operatively connected to the link 46 by a pin 54 that extends through a bore in the arm 52 and has its opposite ends anchored in the bores 51 in the jaws of the clevis. The bell-crank lever 53 is rockably mounted on a pin 54a that extends through a bore 55 in this lever 53 and has its opposite ends anchored in the jaws of a clevis 56 that is formed integral with the main casing section 5.

The outer end of the other arm 57 of the bell-crank lever 53 is disposed between the jaws of a clevis 58 formed at the lower end of a rod 59 and operatively connected thereto by a pin 60 that extends through a bore 61 adjacent the outer end of this arm 57 and has its opposite ends anchored in the jaws of this clevis 58. The rod 59 extends through a bore 62 formed in a first spring seat 63 that is formed integral with the main casing section 5 and extends outward from its right-hand inside wall, as shown in FIG. 1.

Disposed in surrounding relation to the rod 59 and interposed between the first spring seat 63 and a second spring seat 64 having therein a bore 65 through which the rod 59 also extends is a relatively strong brake-applying spring 66. The upper end of the rod 59 is provided with screw threads for receiving a nut 67, the rotation of which is effective to vary the tension of the spring 66 by causing movement of the second spring seat 64 toward or away from the first spring seat 63.

Referring to FIGS. 1 and 3, it will be noted that integral with the upper end of the proportioning lever 32 is a pair of spaced-apart ears 68, each of which is provided with a bore 68a that is coaxial with the bore in the other ear. As shown in FIG. 1, disposed between the ears 68 is one end of a link 69 that is operatively connected to the upper end of the proportioning lever 32 by a pin 70 that extends through a bore 71 in the link 69 adjacent its left-hand end, as viewed in FIG. 1, and has its opposite ends anchored in the respective bores 68a in the ears 68.

As shown in FIGS. 1 and 2, the right-hand end of the link 69 is disposed between the jaws of a clevis 72 and is operatively connected thereto by a pin 73 that extends through a bore 74 in this link 69 and has its opposite ends anchored in the jaws of this clevis.

The clevis 72 is formed at the upper end of a brake lever 75, the structure of which will now be described.

The brake lever 75 intermediate its ends is provided with two oppositely-arranged and outwardly-facing bosses, one of which appears in a broken-away portion, shown in FIG. 2, and is denoted by the reference numeral 76. These bosses are provided with coaxial bores which open into a chamber or cavity 77 located within the lever 75. A pair of sleeve type bearings 78, only one of which appears in FIG. 2, is press-fitted into the coaxial bores in the bosses 76. A pair of oppositely-arranged and inwardly-facing bosses 79, only one of which is shown in FIG. 2, coaxial with the bosses 76, are formed on the opposite walls of the main casing section 55 and each of these bosses is provided with a bore coaxial with the bores in the bosses 76. A pin 80 extends through the bosses 79, bearings 78, chamber 77 and an outwardly-facing boss 81 coaxial with the bosses 79 and formed on the outside wall of the casing section 5 to permit rocking of the brake lever 75 about this pin 80. The pin 80 is retained in place by a locking pin 82 which extends through coaxial bores in the pin 80 and the boss 81.

The cavity or chamber 77 within the lever 75 is open to the exterior of the casing section 5 by way of a passageway 83 in the pin 80, one end of this passageway opening into the chamber 77 and the other opening at the left-hand end of the pin 80, as viewed in FIG. 2. This opening at the left-hand end of the pin 80 is threaded to receive a threaded plug 84 which may be removed to permit the opening to receive the end of a spout of an oil can from which the chamber 77 may be filled with a suitable lubricating oil for lubricating certain parts of the brake assembly hereinafter described.

The bosses 76 of the brake lever 75 constitute a hub for this lever, and extending upward, as viewed in FIG. 2, from this hub are two parallel spaced-apart arms 85 and 86, both of these arms appearing in FIG. 2 but only the arm 86 in FIG. 1. The upper ends of these arms 85 and 86 are connected by a web 87 integral therewith and with the jaws of the hereinbefore-mentioned clevis 72 by which, and the pin 73, the brake lever 75 is operatively connected to the link 69. It may be noted that the arms 85 and 86 are spaced one from the other a sufficient distance for a part of the proportioning lever 32 to be disposed therebetween as is apparent from FIGS. 1 and 2 of the drawings.

As shown in FIG. 1, below the chamber 77 therein, the brake lever 75 is provided with a bore 88 and a coaxial counter bore 89, the axis of which is disposed at right angles to and beneath the axis of the pin 80. Disposed in the counterbore 89 and having one end resting against a shoulder 90 formed at the right-hand end of the counterbore 89 is a two-piece split bushing 91 which is retained in the counterbore 89 by a snap ring 92 that is inserted in a groove formed in the wall surface of this counterbore adjacent the left-hand end thereof. Each half of the bushing 91 is provided with a cavity 93 in the form of a segment of a sphere, the two cavities cooperating to form a seating surface for a member 94, the outer surface of which constitutes a zone of a sphere.

The member 94 is provided with a bore 95, the axis of which is also disposed at right angles to and beneath the axis of the pin 80 and, when in the position shown in FIG. 2, at an acute angle to the axis of the bore 88. Disposed in the bore 95 with a light fit is an internally-threaded sleeve member 96 that has adjacent its left-hand end a shoulder 97 against which abuts the left-hand end of member 94.

A brake rod 98 threaded at one end has screw-threaded engagement with the internally-threaded sleeve member 96 and at the other end is pivotally connected to one end of the brake head hanger 4 and the brake head 1, as by a bolt 99 and a nut (not shown).

The left-hand end of the brake rod 98 is provided, as shown in FIG. 1, with a slot 100 in which is disposed a flat leaf type centering spring 101. As shown in FIG. 1, the upper end of this spring 101 rests against a boss 102 that constitutes one side of a web 103 that integrally connects two spaced-apart ribs 104, only one of which is shown in FIG. 1, formed on the back of the brake head 1. The lower end of the spring 101 is bent around a headed pin 105 that extends through two coaxial bores provided in the ribs 104.

In order to prevent the entrance of water, ice and dirt to the interior of the main casing section 5, a rubber boot 106 surrounds an opening 107 in the left-hand end wall of the main casing section 5 through which opening the brake rod 98 extends. The opposite ends of the boot 106 are provided with beads which fit respectively around the periphery of the brake rod 98 and into a groove formed in an annular plate 108 that is secured to the main casing section 5 by a plurality of cap screws 109, two of which appear in FIG. 1.

It is apparent from FIG. 1 that as the braking surface of the brake shoe 2 wears away, the travel of the brake rod 98 in the direction of the left hand will increase upon each successive application of the brakes. Therefore, in order to maintain the same travel distance for the brake rod 98 upon each subsequent application of the brakes as the brake shoe 2 wears away, the brake assembly is provided with an automatic slack take-up or adjuster mechanism 110 which may be of any suitable commercial construction. Since this slack adjuster mechanism forms no part of the present invention, a detailed description of its construction and operation is believed to be unnecessary. However, for operating the automatic slack adjuster mechanism 110, the brake assembly comprising the present invention includes a slack adjuster operating linkage which will now be described.

As shown in FIG. 1 of the drawings, a clevis 111 is formed integral with and extends outward from the back wall of the main casing section 5. Anchored in the opposite jaws of the clevis 111 are the opposite ends of a pin 112 on which is rockably mounted a bell-crank lever 113, one arm 114 of which lies in the path of movement of the web 87 of brake lever 75. It will be understood that if, during a brake application, the brake shoe 2 begins to wear away, the brake lever 75 will be rocked clockwise, as viewed in FIG. 1, far enough for the web 87 of this brake lever to strike the arm 114. Consequently, as the brake shoe 2 wears away, the bell-crank lever 113 will be rocked counterclockwise about the pin 112.

As shown in FIG. 1, the bell-crank lever 113 comprises a second arm 115 that is disposed between the jaws of a clevis 116 formed at the upper end of an operating rod 117 and operatively connected thereto by a pin 118 that extends through a bore (not shown) adjacent the right-hand end of the arm 115 and has its opposite ends anchored in a bore 119 that extends through the jaws of the clevis 116.

The operating rod 117 extends downward through a bore 120 formed in a bracket 121 integral with the casing section 5 and adjacent its lower end is provided with a bore 122 through which extends a pin 123 that has its opposite ends anchored in the jaws of a clevis 124 formed at the right-hand end, as viewed in FIG. 1, of a lever 125. This lever 125 is rockably mounted on a pin 126, the opposite ends of which are anchored in the jaws of a clevis 127 integral with the bracket 121.

The lever 125 abuts a roller 128 that constitutes a part of the above-mentioned automatic slack adjuster mechanism 110. Consequently, it is apparent that rocking of the lever 125 by the above-described slack adjuster operating linkage will effect operation of the slack adjuster mechanism 110 to take up slack resulting from brake shoe wear by rotating the sleeve member 96 relative to the brake rod 98 to thus increase the length of this brake rod as the brake shoe 2 wears away.

In order to manually rotate the sleeve member 96 to let out slack prior to replacing a worn brake shoe, a bevel gear 129 is mounted on this sleeve member so as to be rotatable therewith. This bevel gear 129 may be rotated when a bevel gear 130 of a manually operable slack adjuster 131 is moved into mesh therewith. The slack adjuster 131 may be any suitable commercially available manual slack adjuster such as, for example, the manually operable slack adjuster for vehicle brakes shown and described in U.S. Pat. No. 3,158,235, issued Nov. 24, 1964, to Earl E. Allan and assigned to the assignee of the present application.

In order to provide, in customary fashion, for release of the brakes, should the loss of supply of electric power to the torque motor 14 occur, a pair of spaced-apart fingers 132, only one of which is shown in FIG. 1, is formed integral with the lower end of a hand brake lever 133 which is rockably mounted on a pin 134, the opposite ends of which are anchored in coaxial bores (not shown) provided in a cover member 135 secured to the main casing section 5 by any suitable means (not shown). The fingers 132 are disposed on the opposite side of the control rod 21 and adapted to contact the spring seat 21a when the hand brake lever 133 is rocked counterclockwise to release the brakes subsequent to a loss of electric power. The upper end of the hand brake lever 133 may be connected by a chain or other suitable means to the hand brake wheel which is located at one end of a railway car.

OPERATION

When the torque motor 14 (FIG. 2) of the brake assembly constituting the present invention is supplied with current through a power supply circuit (not shown), it is effective to rotate its armature shaft and, through the reduction gear unit 13, the shaft 15 (FIG. 1) in a clockwise direction. This clockwise rocking of the shaft 15 is effective to rock the bell-crank lever 16 rigidly secured to the shaft 15 in the same direction to cause, via arm 17, movement of control rod 21 and spring seat 21a integral therewith in the direction of the right hand, as viewed in FIG. 1, until the right-hand end of this rod 21 abuts the stop 24, thereby effecting compression of the control spring 25 until it occupies the position shown.

Furthermore, as the bell-crank lever 16 is rocked clockwise to the position shown in FIG. 1, it is effective via its arm 26, pin 29, clevis 27, link 28 and pin 34, to move the carriage member 37 downward, as viewed in FIGS. 1 and 2, along the track rails 35 and 36 to the position shown.

It will be noted from FIG. 1 that, while the carriage member 37 occupies the position shown, the center of the pin 42, on which are mounted the rollers 43 that constitute a fulcrum for the proportioning lever 32, is disposed a distance A below the center of the pin 54 which operatively connects the arm 52 of the bell-crank lever 53 to the link 46, the portion 48 of which is press-fitted into the bore 45 provided in the proportioning lever 32. Consequently, it is apparent that in this position of carriage member 37, the brake-applying spring 66 is effective to transmit a force to the pin 54 via spring seat 64, nut 67, rod 59 and the arms 57 and 52 of the bell-crank lever 53, that acts in the direction of the left hand, as viewed in FIG. 1, and that the line of action of this force is above the center of the pin 42. It is further apparent from FIGS. 1 and 3 that the fulcrum rollers 43 contact the cam surface 44 along a line that, as viewed in FIG. 1, is below the axis of the pin 54. Accordingly, the force transmitted at this time to the pin 54 by the brake-applying spring 66 is ineffective to rock the proportioning lever 32 clockwise about the fulcrum rollers 43. Consequently, the proportioning lever 32 is ineffective, via the link 69, to rock the brake lever 75 clockwise or in a brake-applying direction about the pin 80.

Since the force transmitted to the axis of the pin 54 by the brake-applying spring 66 acts in the direction of the left hand and along a line that passes above the axis of pin 42 and the line of contact of the rollers 43 with the cam surface 44 on the proportioning lever 32, it is apparent that this force produces a moment, the lever arm of which is the vertical distance between the pins 42 and 54, that acts in the direction to rock the proportioning lever 32 counterclockwise about the fulcrum rollers 43. Since the upper end of the proportioning lever 32 is connected to the brake lever 75 by the link 69, it is apparent that the above-mentioned moment acting on the proportioning lever 32 is effective, via the link 69, to rock the brake lever 75 in a counterclockwise direction, as viewed in FIG. 1, to its release position in which it is shown.

It may be assumed that, while the brakes are released, all parts of the brake assembly constituting the present invention occupy the position in which they are shown in the drawings, and that the torque motor 14 is supplied, via its power supply circuit, with a maximum amount of current.

In operation, when it is desired to effect a light brake application, the engineer of the train will effect, through any suitable means (not shown), a reduction in the energizing current supplied to the torque motor 14 to cause a corresponding reduction in the output torque of this motor. Consequently, upon this reduction in the output torque of the torque motor 14 (FIG. 2), there is insufficient torque applied to the shaft 15 (FIG. 1) for the force transmitted by the arm 17 of the bell-crank lever 16 to the control rod 21, via the pin 19, to maintain the control spring 25 in its fully compressed position in which it is shown in FIG. 1. Therefore, when the output torque of the torque motor 14 is reduced in the manner just explained, the control spring 25 partially expands to release the stored energy in this spring until the remaining stored energy therein balances the reduced output torque of the motor 14, it being understood that this reduced output torque is transmitted from the torque motor 14 to the control spring 25, via the reduction gear unit 13, shaft 15, bell-crank lever 16, pin 19, control rod 21 and spring seat 21a.

As the control spring 25 expands to release the stored energy therein, it effects movement of the control rod 21 in the direction of the left hand away from the stop 24 to cause counterclockwise rocking of the bell-crank lever 16 since rod 21 is operatively connected to the arm 17 of this lever 16 by the pin 19. As the bell-crank lever 16 is thus rocked counterclockwise, its arm 26 is effective, via pins 29 and 34 and the link 28, to move the carriage member 37 upward, as viewed in FIGS. 1 and 2, as the flanged wheels 40 roll along the rails 35 and 36. The carriage member 37 is thus moved upward along the rails 35 and 36 as the control spring 25 expands until the remaining stored energy in this spring balances the reduced output torque of the torque motor 14.

As the carriage member 37 is moved upward along the rails 35 and 36 in the manner just described, the pin 42 and the movable fulcrum comprising the two rollers 43 mounted on this pin 42 are likewise moved upward since this pin is carried by the bars 38 and 39 that constitute a part of the carriage member 37. As these fulcrum rollers 43 are thus moved upward, they roll along the cam surface 44 on the proportioning lever 32. Consequently, it can be seen from FIG. 1 that the line of contact between these rollers 43 and the cam surface 44 is shifted upward as the carriage member 37 is moved upward.

It is apparent from FIG. 1 of the drawings that, subsequent to a chosen minimum amount of movement in an upward direction of the carriage member 37 along the rails 35 and 36, the axis of the pin 42 and the line of contact between the fulcrum rollers 43 and the cam surface 44 is shifted from a position below the axis of the pin 54 to a position above this axis. It is further apparent that the greater the reduction in the energizing current supplied to the torque motor 14, the greater the distance the axis of the pin 42 and the line of contact between the fulcrum rollers 43 and the cam surface 44 on the proportioning lever 32 is shifted above the axis of the pin 54, thus increasing the mechanical advantage of this lever 32.

It will be noted that upon shifting of the line of contact between the fulcrum rollers 43 and the cam surface 44 on the proportioning lever 32 to a position above the axis of the pin 54, the force transmitted to the pin 54 by the brake-applying spring 66 in the manner hereinbefore-described is effective to rock the proportioning lever 32 clockwise about these fulcrum rollers 43. This clockwise rocking of the proportioning lever 32 is effective, via link 69 and pins 70 and 73, to cause the brake lever 75 to be rocked clockwise about the bearings 78 (FIG. 2) on the pin 80. Since the brake lever 75 is pivotally connected to the brake rod 98 by means of the ball joint formed by the two-piece split bushing 91 and the member 94, clockwise rocking of the brake lever 75 is effective to move the brake rod 98 in the direction of the left hand to bring the brake shoe 2 into contact with the tread surface of a wheel (not shown) to effect a braking action on this wheel.

Considering the rollers 43 as the fulcrum for the proportioning lever 32 and that the brake-applying spring 66 applies a certain force to one end of this lever 32, via the pin 54, it will be noted that the braking force transmitted to the tread surface of the wheel increases as the distance from the axis of the pin 54 to the line of contact between the fulcrum rollers 43 and the cam surface 44 on the proportioning lever 32 increases. In other words, the further up the track, rails 35 and 36, the carriage member 37, and the fulcrum rollers 43 carried thereon, are moved by the control spring 25 in response to a reduction in the energization current supplied to the torque motor 14, the greater is the braking force applied by the brake shoe 2 to the tread surface of the wheel. Accordingly, the braking force applied to the tread surface of the wheel varies inversely as the current supplied to the torque motor 14.

When it is desired to effect a release of the light brake application, the engineer will effect an increase in the energizing current supplied to the torque motor 14 until this motor is supplied with maximum current, whereupon the torque output of this torque motor will increase to its maximum value. Consequently, the torque motor 14 (FIG. 2) will now, through its armature shaft, reduction gear unit 13 and shaft 15 (FIG. 1), effect rotation of the bell-crank lever 16 in a clockwise direction, as viewed in FIG. 1. This clockwise rotation of the bell-crank lever 16 is effective to move the control rod 21 in the direction of the right until its right-hand end abuts the stop 24 to cause the spring seat 21a, integral with the rod 21, to compress the control spring 25 to the position shown in FIG. 1, thereby storing energy in this spring.

Furthermore, this clockwise rocking of the bell-crank lever 16 is effective, via its arm 26, pins 29 and 34 and the link 28, to move the carriage member 37 downward along the rails 35 and 36 to the position shown in the drawings. As the carriage member 37 is thus moved downward to the position shown, the rollers 43 roll along the cam surface 44 on the proportioning lever 32, thereby causing a decrease in the braking force transmitted to the tread surface of the wheel by the brake-applying spring 66. When the line of contact between the fulcrum rollers 43 and the cam surface 44 passes below the axis of the pin 54, the force transmitted to this pin no longer applies a braking force to the tread surface of the wheel but, on the other hand, is effective to rock the proportioning lever 32 counterclockwise about the fulcrum rollers 43. This counterclockwise rocking of the lever 32 is effective, via the pins 70 and 73 and the link 69, to rock the brake lever 75 counterclockwise about the bearings 78 (FIG. 2) carried by the pin 80 to cause the brake shoe 2 to be moved away from the tread surface of the wheel to its release position shown in FIG. 1.

Now, let it be supposed that while the brakes are released, the engineer desires to effect a heavier brake application than was effected in the manner previously described. To do so, he will effect a greater reduction of the degree of energizing current supplied to the torque motor 14 than when the above-described light brake application was effected to cause a greater reduction in the output torque of the torque motor 14. When the output torque of the torque motor 14 is thus reduced, the control spring 25 expands to release the stored energy therein until the remaining stored energy balances the output torque of the motor 14. As the spring 25 thus expands, it is effective in the manner hereinbefore described to move the carriage member 37 a greater distance up the rails 35 and 36, the position reached by the carriage member 37 being determined by the degree of reduction in the energizing current supplied to the torque motor 14.

It is apparent that the further up the rails 35 and 36 the carriage member 37 is moved, the greater will be the distance between the axis of the pin 54 and the line of contact between the fulcrum rollers 43 and the cam surface 44 on lever 32. Consequently, a greater braking force will be applied by the brake shoe 2 to the tread surface of the wheel than was applied when effecting the light brake application previously described.

When it is desired to release this moderately heavy brake application, the engineer effects a restoration of energization of the torque motor 14 until it is supplied with maximum current, whereupon the brake shoe 2 carried by the brake head 1 will be moved away from the tread surface of the wheel in the manner hereinbefore described.

Let it now be supposed the engineer desires to effect a full brake application. To do so, he decreases to zero the current supplied to the torque motor 14, whereupon the output torque of this motor is reduced to zero. Therefore, upon the cut off of the supply of electric current to the torque motor 14, the control spring 25 will expand a maximum amount to release the stored energy therein to effect, in the manner previously described, a full application of the brakes. Consequently, the force of the brake-applying spring 66 is effective through a lever arm of maximum length to press the brake shoe 2 against the tread surface of the wheel to provide a maximum braking force on the wheel.

Should brake shoe wear occur while a brake application is in effect, it will be noted from FIGS. 1 and 2 that the arms 85 and 86 of the brake lever 75 will be rocked in a clockwise direction far enough for the web 87 connecting these arms to strike the arm 114 of the bell-crank lever 113 and, upon further clockwise rocking of this lever 75 in response to continued brake shoe wear, effects counterclockwise rocking of bell-crank lever 113.

It is apparent from FIG. 1 that as the bell-crank lever 113 is rocked counterclockwise, it is effective via the operating rod 117 to cause the lever 125 to be rocked counterclockwise about the pin 126 to move the roller 128 downward. Referring to FIG. 2, it is apparent that this downward movement of the roller 128 is effective to move a slack adjuster pawl 136 upward. Consequently, when the brake shoe 2 has worn a chosen amount, the pawl 136 will be moved upward a sufficient distance to drop into the space between two teeth 137 and 138 on a ratchet wheel 139. Consequently, when the brakes are subsequently released under these conditions, the pawl 136 will be effective to rotate the ratchet wheel 139 and the sleeve member 96 to which it is secured by a key 140 that is integral with this ratchet wheel. Rotation of the brake rod 98 is prevented by its connection to the brake head 1 and hanger 4. Therefore, the screw-threaded sleeve member 96 is unscrewed from the screw-threaded portion of the brake rod 98, thus moving the brake shoe 2 in the direction of the wheel and taking up the slack occurring as a result of the wearing away of the brake shoe 2.

The above-described full brake application can be subsequently released by the engineer in the same manner as hereinbefore described for effecting a light brake application.

When the brake shoe 2 has completely worn out and it is to be replaced with a new shoe, it is necessary to reduce the length of the brake rod 98 since the thickness of the new brake shoe is greater than that of the worn shoe. The length of the brake rod 98 may thus be reduced by operating the manual slack adjuster 131 in the manner described in hereinbefore-mentioned Pat. No. 3,158,235.

If the loss of supply of electric power to the torque motor 14 should occur while the brakes are released, the control spring 25 will expand to move the carriage member 37 to its uppermost position along the rails 85 and 86, whereupon the brake-applying spring 66 will cause a maximum braking force to be applied to the tread surface of the wheel.

To effect a manual brake release, the hand brake wheel will be manually rotated in the brake-applying direction to rock, via the chain connected to the hand brake lever 133, this lever 133 counterclockwise, as viewed in FIG. 1, whereupon the fingers 132 will contact the left-hand side of the spring seat 21a. The continued counterclockwise rocking of the lever 133 is effective to move the control rod 21 and spring seat 21a integral therewith in the direction of the right hand until the right-hand end of the rod 21 abuts the stop 24. This manual movement of the spring seat 21a is effective to compress the spring 25 and move the carriage member 27 downward to the position shown in FIG. 1, whereupon the brakes will be released in the same manner as hereinbefore described.

Having now described the invention, what I claim as new and desire to secure by Letters Patent, is:

1. A tread brake assembly for applying a braking force to a wheel of a railway vehicle truck, said assembly comprising:
   a. brake shoe means for applying a braking force to a vehicle wheel, and
   b. a pivoted lever effective upon rocking in one direction to apply said brake shoe means and upon rocking in the opposite direction to release said brake shoe means, wherein the improvement comprises:
   c. means for actuating said pivoted lever including:
      i. a proportioning lever operatively connected at one end to said pivoted lever,
      ii. a movable fulcrum means for said proportioning lever,
      iii. brake-applying spring means operatively connected to the other end of said proportioning lever, which means in one position of said movable fulcrum means transmits, via said proportioning lever, a moment of force to said pivoted lever that acts to rock said pivoted lever in a brake-releasing direction, and which in another position of said movable fulcrum means transmits, via said proportioning lever, a moment of force to said pivoted lever that acts to rock said pivoted lever in a brake-applying direction, and iv. power means for varying the position of said movable fulcrum means relative to said proportioning lever.

2. A tread brake assembly, as claimed in claim 1, further characterized in that said power means comprises:
   a. a control spring,
   b. a bell-crank lever, operably connected to said control spring and said movable fulcrum for varying the position of said fulcrum according to the compression of said control spring, and
   c. a torque motor so operably connected to said bell-crank lever as to vary the compression of said spring directly as the output torque of said motor is varied.

3. A tread brake assembly, as claimed in claim 1, further characterized in that said pivoted lever is pivoted intermediate its ends and operatively connected at one end to said proportioning lever, and by a rigid rod operatively connected to said brake shoe means and swivelly connected to the other end of said pivoted lever in a manner to move said brake shoe means into and out of braking engagement with the vehicle wheel upon corresponding pivotal movement of said pivoted lever in response to the moment of force transmitted thereto by said proportioning lever from said brake-applying spring means, the degree of said moment of force varying in accordance with the position of said fulcrum means relative to said proportioning lever.

4. A tread brake assembly, as claimed in claim 1, further characterized in that said movable fulcrum means comprises:
   a. stationary track means, and
   b. a wheeled carriage member carrying a fulcrum for said proportioning lever, said wheeled carriage member being borne by said track means and movable in opposite directions therealong to shift said fulcrum relative to said proportioning lever from a first position in which said moment of force transmitted to said pivoted lever acts to rock said pivoted lever in said brake-releasing direction to another position in which said moment of force acts to rock said pivoted lever in a brake-applying direction, the value of said moment of force increasing as said fulcrum is shifted further from said first position.

5. A tread brake assembly, as claimed in claim 1, further characterized in that said pivoted lever comprises a hub from which extends a pair of spaced-apart parallel arms curved adjacent their outer ends and operatively connected to one end of said proportioning lever, the opposite end of which lever is disposed between said spaced-apart arms, and by a pivoted bell-crank lever having one arm operatively connected to said opposite end of said proportioning lever and another arm operatively connected to said brake-applying spring means, said bell-crank lever being effective to transmit said moment of force from said brake-applying spring means to said opposite end of said proportioning lever without substantial expansion of said brake-applying spring means.

6. A tread brake assembly, as claimed in claim 1, further characterized in that said proportioning lever is provided with a cam surface along which said movable fulcrum means travels, that portion of said cam surface initially traversed by said fulcrum means constituting an arc of a circle and the remaining portion being a straight line.

7. A tread brake assembly for applying a braking force to a wheel of a railway vehicle truck having a side frame, said brake assembly comprising in combination:
   a. a casing fixed with respect to the car truck side frame and having a chamber therein, said casing having two spaced walls in each of which is a bore coaxial with the bore in the opposite wall,
   b. a fulcrum member having its opposite ends disposed in said bores in said opposite walls,
   c. a brake lever disposed within said chamber and rockably mounted intermediate its ends on said fulcrum member, said brake lever having a pair of spaced-apart parallel arms extending in one direction from said fulcrum member and a single arm extending in the opposite direction,
   d. a brake shoe,
   e. a brake head carrying said shoe,
   f. a brake head hanger pivotally mounted at one end on said casing and pivotally connected at the other end in supporting relation to said brake head,
   g. a rigid rod member pivotally connected at its one end to the brake head and extending through one wall of said casing into said chamber,
   h. universal swivel means connecting the portion of said rigid rod member within said chamber to said single arm of said brake lever, whereby movement of the brake shoe out of and into braking contact with the tread surface of the car wheel is effected respectively by movement of said rigid rod member in one direction or in an opposite direction in response to rocking of said brake lever in said directions, wherein the improvement comprises:
   i. a brake-applying spring supported at one end on said casing,
   j. a first bell-crank lever pivotally mounted on said casing and having a pair of arms, one of which is operatively connected to the other end of said brake-applying spring, whereby said spring is effective to bias said bell-crank lever in one direction,
   k. a proportioning lever having thereon a cam surface, said lever being operatively connected at one end of said cam surface to said pair of spaced-apart parallel arms of said brake lever and connected intermediate the ends of said cam surface to the other arm of said first bell-crank lever,
   l. a track carried by said casing,
   m. a carriage member movably supported on said track and carrying a pair of fulcrum rollers that roll along said cam surface as said carriage member is moved along said track,
   n. a control spring supported at one end on said casing,
   o. a second bell-crank lever pivotally mounted on said casing and having a pair of arms, one arm being operatively connected to the other end of said control spring and the other arm to said carriage member, whereby the expansion of said spring is effective, via said second bell-crank lever, to move said carriage member along said track thereby to shift said pair of fulcrum rollers with respect to said cam surface from a first position in which said rollers abut said cam surface below the connection of said other arm of said first bell-crank lever with said proportioning lever to another position above this connection, thereby rendering said brake-applying spring ineffective to rock said proportioning lever in a brake-releasing direction and effective to rock said lever in a brake-applying direction, whereby the mechanical advantage provided by said proportioning lever is increased as said carriage member is moved along said track, and p. brake-release means including a torque motor and a reduction gear unit operatively connected to said second bell-crank lever for effecting rocking thereof in the direction to compress said control spring and shift said carriage member and pair of fulcrum rollers carried thereby to said first position in response to the supply of electric power to said torque motor.

8. A tread brake assembly, as claimed in claim 7, further characterized in that said cam surface on said proportioning lever is formed on one side thereof and comprises two portions, one of which constitutes a straight line and the other an arc of a circle, and said other arm of said first bell-crank lever being pivotally connected to said proportioning lever intermediate the ends of said arc portion of said cam surface, whereby said pair of fulcrum rollers is shiftable from one side to the other of the connection of said one arm of said first bell-crank lever with said proportioning lever as said carriage member is moved from said first position to another position.

9. A tread brake assembly for applying a braking force to a wheel of a railway vehicle truck having a side frame, said assembly comprising:
   a. a casing immovably supported on said side frame,
   b. a brake-shoe-carrying brake head movably supported on said casing for movement into braking contact with said wheel,
   c. a brake-applying spring supported at one end on said casing,
   d. a brake lever rockably mounted intermediate its ends on said casing and operatively connected at one end to said brake head,
   e. a linkage operatively connecting the other end of said brake-applying spring to the other end of said brake lever, said linkage comprising:
      i. a bell-crank lever rockably mounted on said casing and having one arm connected to said other end of said brake-applying spring, whereby said spring is effective to rock said bell-crank lever in one direction,
      ii. a proportioning lever having formed thereon a cam surface, one portion of which constitutes a straight line and another an arc of a circle,
      iii. a first link pivotally connected at one end to one end of said proportioning lever and at the other to said other end of said brake lever, and
      iv. a second link pivotally connected at one end to the other arm of said bell-crank lever and having its other end rigidly secured to said proportioning lever intermediate the ends of said other cam portion,
   f. a shiftable fulcrum for contact by said cam surface on said proportioning lever and shifted to increase or decrease the moment of force transmitted to said proportioning lever by said brake-applying spring and from one position in which said moment of force is effective to rock said proportioning lever about said fulcrum in a brake-releasing direction to another position in which said moment of force is effective to rock said proportioning lever in a brake-applying direction, the value of said moment of force increasing accordingly as the distance between said shiftable fulcrum and the pivotal connection of said one end of said second link with said other arm of said bell-crank lever is increased, and
   g. power means selectively operable to cause shifting of said shiftable fulcrum in either direction along said cam surface on said proportioning lever.

10. A tread brake assembly, as claimed in claim 9, further characterized in that said power means comprises:
   a. a rockable shaft,
   b. a second bell-crank lever rigidly mounted on said shaft and having one arm operably connected to said shiftable fulcrum, whereby said fulcrum is shifted in one direction or an opposite direction accordingly as said lever is rocked in said one or said opposite direction,
   c. a control rod operatively connected at one end to the other arm of said second bell-crank lever and having intermediate its ends a spring seat,
   d. a stop carried by said casing and disposed in the path of movement of said control rod for limiting movement of said rod in one direction,
   e. a control spring disposed about said control rod and interposed between said casing and said spring seat for moving said control rod in an opposite direction, and
   f. a torque motor operatively connected to said shaft, whereby rocking of said shaft and said second bell-crank lever in the direction to effect movement of said control rod in its said one direction to compress said control spring is effected by said torque motor, upon the supply of electric power thereto.

11. A tread brake assembly, as claimed in claim 10, further characterized by a hand brake lever pivotally mounted intermediate its ends on said casing, said hand brake lever having formed integral with one end thereof a pair of spaced-apart fingers which straddle said control rod and abut said spring seat upon rocking said hand brake lever in one direction to cause compression of said control spring and shifting of said shiftable fulcrum in a brake-releasing direction independently of said torque motor.

* * * * *